United States Patent
Nagendra et al.

(10) Patent No.: US 9,135,198 B2
(45) Date of Patent: Sep. 15, 2015

(54) METHODS AND STRUCTURE FOR SERIAL ATTACHED SCSI EXPANDERS THAT SELF-CONFIGURE BY SETTING ROUTING ATTRIBUTES OF THEIR PORTS BASED ON SMP REQUESTS

(71) Applicant: LSI Corporation, Milpitas, CA (US)

(72) Inventors: Raghavendra Channagiri Nagendra, Bangalore (IN); Naresh Madhusudana, Bangalore (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 171 days.

(21) Appl. No.: 13/664,977

(22) Filed: Oct. 31, 2012

(65) Prior Publication Data

US 2014/0122761 A1  May 1, 2014

(51) Int. Cl.
*G06F 13/00* (2006.01)
*G06F 13/40* (2006.01)

(52) U.S. Cl.
CPC .............. *G06F 13/40* (2013.01); *G06F 13/409* (2013.01)

(58) Field of Classification Search
USPC .................................................. 710/300–317
See application file for complete search history.

(56) References Cited

U.S. PATENT DOCUMENTS

| | | | |
|---|---|---|---|
| 4,156,798 A | 5/1979 | Doelz | |
| 5,335,227 A | 8/1994 | Smith | |
| 5,579,480 A | 11/1996 | Cidon | |
| 6,096,116 A | 8/2000 | Huff et al. | |
| 6,199,137 B1 | 3/2001 | Aguilar | |
| 6,301,642 B1 | 10/2001 | Jones et al. | |
| 6,611,863 B1 | 8/2003 | Banginwar | |
| 7,644,168 B2 * | 1/2010 | Grieff et al. | 709/229 |
| 7,650,446 B2 | 1/2010 | Nonaka | |
| 7,738,366 B2 | 6/2010 | Uddenberg | |
| 7,912,992 B2 | 3/2011 | Suzuki | |
| 7,913,023 B2 * | 3/2011 | Johnson et al. | 710/307 |
| 8,077,605 B2 * | 12/2011 | McCarty et al. | 370/225 |
| 8,321,596 B2 * | 11/2012 | Johnson et al. | 710/2 |
| 8,402,196 B2 * | 3/2013 | Davis et al. | 710/313 |
| 8,539,096 B2 * | 9/2013 | Voorhees et al. | 709/238 |
| 8,756,355 B2 * | 6/2014 | Aggarwal et al. | 710/104 |
| 2002/0046566 A1 | 4/2002 | Liao | |
| 2003/0076788 A1 | 4/2003 | Grabauskas et al. | |
| 2003/0097438 A1 | 5/2003 | Bearden | |
| 2003/0217212 A1 | 11/2003 | Kim | |
| 2004/0205288 A1 | 10/2004 | Ghaffari | |
| 2005/0015532 A1 | 1/2005 | Beckett | |

(Continued)

OTHER PUBLICATIONS

IBM SAS RAID Controller Module, Installation and user guide v2, © Copyright IBM Corp. 2008, 2009.

(Continued)

*Primary Examiner* — Raymond Phan
(74) *Attorney, Agent, or Firm* — Duft Bornsen & Fettig

(57) ABSTRACT

Methods and structure are provided for Serial Attached SCSI (SAS) expanders that program their own routing attributes. The structure includes a SAS expander comprising multiple physical links with associated transceivers (PHYs), wherein the PHYs are configured into ports at the expander, and a memory that defines routing attributes for each of the ports. The SAS expander also comprises a control unit that is operable to detect a discovery Serial Management Protocol (SMP) request received at a port of the expander, and that is further operable to set the routing attribute for the port to subtractive routing responsive to detecting the SMP request.

20 Claims, 4 Drawing Sheets

(56) References Cited

U.S. PATENT DOCUMENTS

| | | |
|---|---|---|
| 2005/0066100 A1 | 3/2005 | Elliott |
| 2005/0080881 A1 | 4/2005 | Voorhees |
| 2006/0095625 A1* | 5/2006 | Wootten et al. ............... 710/300 |
| 2006/0101171 A1 | 5/2006 | Grieff |
| 2006/0156055 A1 | 7/2006 | Cherian |
| 2007/0220204 A1 | 9/2007 | Nakajima |
| 2007/0226415 A1 | 9/2007 | Holland |
| 2008/0189723 A1 | 8/2008 | Elliott |
| 2008/0288670 A1 | 11/2008 | Chambliss et al. |
| 2009/0007155 A1* | 1/2009 | Jones et al. ................... 719/327 |
| 2009/0094620 A1 | 4/2009 | Kalwitz |
| 2009/0282203 A1 | 11/2009 | Haustein et al. |
| 2011/0145452 A1 | 6/2011 | Schilling |
| 2012/0084486 A1 | 4/2012 | Jinno |
| 2012/0124286 A1 | 5/2012 | Galloway |
| 2012/0144082 A1 | 6/2012 | Romero |
| 2012/0254535 A1 | 10/2012 | Hay |
| 2013/0013828 A1 | 1/2013 | Pang et al. |
| 2014/0040510 A1* | 2/2014 | Myrah et al. .................... 710/11 |

OTHER PUBLICATIONS

Intel® RAID Expander RES2SV240, Product Brief.
Nested RAID levels, wikipedia, downloaded on Oct. 8, 2012.
U.S. Appl. No. 13/096,404, "Remote Execution of RAID in Large Topologies," filed Apr. 28, 2011.
U.S. Appl. No. 13/171,922, "Methods and Apparatus for Increasing Storage Network Perfromance by Managing a Logical Volume in a Storage Network Switching Component," filed Jun. 29, 2011.
U.S. Appl. No. 13/281,301, "Methods and Systems Using Solid-State Drives as Storage Controller Cache Memory ," filed Oct. 25, 2011.
U.S. Appl. No. 13/365,050, "Methods and Structure for an Improved Solid-State Drive for Use in Caching Applications," filed Feb. 2, 2012.

* cited by examiner

METHODS AND STRUCTURE FOR SERIAL ATTACHED SCSI EXPANDERS THAT SELF-CONFIGURE BY SETTING ROUTING ATTRIBUTES OF THEIR PORTS BASED ON SMP REQUESTS

BACKGROUND

1. Field of the Invention

The invention relates generally to Serial Attached SCSI (SAS) systems, and more specifically relates to SAS expanders.

2. Discussion of Related Art

In SAS domains (i.e., electronic systems implementing a switched SAS fabric) it is common for a SAS initiator to communicate with a large number of SAS or Serial Advanced Technology Attachment (SATA) end devices. The end devices may comprise, for example, SAS/SATA storage devices that provision one or more logical volumes of data. In a SAS domain, the end devices may be coupled for communication with the initiator via one or more SAS expanders. The SAS expanders serve to establish switched temporary communication channels between the initiator and the various storage devices.

Each SAS expander includes multiple physical links with associated transceivers (PHYs). The PHYs are used to define SAS ports. For example, a SAS port made from a single PHY is referred to as a narrow port, while SAS ports that comprise multiple PHYs are referred to as wide ports.

When a SAS expander is first initialized (e.g., during discovery), each port of the expander has its routing attributes (i.e., the routing attributes of each of its PHYs) configured by an outside source. A routing attribute defines how the SAS expander decides to route incoming requests to establish communications between SAS devices. An example of such a request is an OPEN Address Frame (OAF). The routing attributes may be defined as "subtractive," "table," or "direct."

Direct routing is used when a PHY is directly coupled with an end device (e.g., a storage device). The SAS expander is made aware of the end device during discovery. Thus, when an incoming request indicates the SAS address of the end device, the SAS expander may immediately establish connections with the end device using the port that is directly coupled with the device.

Table routing is used by a SAS expander when a port is coupled with a known set of SAS addresses (e.g., coupled with multiple devices via one or more expanders). A routing table is kept in memory and associated with the ports that have been set to table routing. The routing table indicates the SAS addresses that are available via the various table routing ports. When an incoming request is received that requests one of those SAS addresses, the appropriate port is used to forward the request.

Subtractive routing is used to define a "port of last resort." A port with a subtractive routing attribute is used whenever a requested SAS address is not identified in a routing table at the expander and is not directly connected to the SAS expander. Ideally, there will be only one subtractive routing port per expander.

As normally implemented, routing attributes are configured manually by a systems engineer, typically using a configuration tool on a management system coupled with the expander. This is a time-consuming process, and can create problems if the SAS domain is not properly configured (i.e., due to human error). For example, if two ports that are coupled to each other each use subtractive routing, then incoming requests could potentially bounce between those two ports in an infinite loop. This may cause system instabilities, and may prevent complete discovery of the SAS domain.

In further systems, a SAS initiator may coordinate and manage the configuration of routing attributes of SAS expanders by discovering each SAS expander and programming the routing attributes each individual port of each expander. However, this is also a time-consuming process for the initiator that occupies a great deal of processing power and bandwidth at the SAS domain, because the initiator must communicate with each end device and expander of the domain.

Thus it is an ongoing challenge to configure the routing attributes of ports of SAS expanders in an efficient manner.

SUMMARY

The present invention addresses the above and other problems, thereby advancing the state of the useful arts, by providing methods and structure for SAS expanders to automatically configure the routing attributes of their own ports. This helps to distribute the processing load across many devices in the SAS domain, which in turn increases the speed at which the routing attributes of the various expanders of the domain can be programmed.

In one aspect hereof, a method is provided for operating a Serial Attached SCSI (SAS) expander comprising multiple physical links with associated transceivers (PHYs), wherein the PHYs are configured into ports. The method comprises detecting, via a control unit of the expander, a discovery Serial Management Protocol (SMP) request received at a port of the expander. The method further comprises setting, via the control unit, a routing attribute in memory for the port to subtractive routing responsive to detecting the SMP request.

Another aspect hereof provides a Serial Attached SCSI (SAS) expander comprising multiple physical links with associated transceivers (PHYs), wherein the PHYs are configured into ports at the expander, and a memory that defines routing attributes for each of the ports. The SAS expander also comprises a control unit that is operable to detect a discovery Serial Management Protocol (SMP) request received at a port of the expander, and that is further operable to set the routing attribute for the port to subtractive routing responsive to detecting the SMP request.

Another aspect hereof provides a non-transitory computer readable medium embodying programmed instructions which, when executed by a processor, are operable for performing a method for operating a Serial Attached SCSI (SAS) expander comprising multiple physical links with associated transceivers (PHYs), wherein the PHYs are configured into ports. The method comprises detecting, via a control unit of the expander, a discovery Serial Management Protocol (SMP) request received at a port of the expander. The method further comprises setting, via the control unit, a routing attribute in memory for the port to subtractive routing responsive to detecting the SMP request.

Other exemplary embodiments (e.g., methods and computer-readable media relating to the foregoing embodiments) may be described below.

DETAILED DESCRIPTION OF THE DRAWINGS

Figure 1:
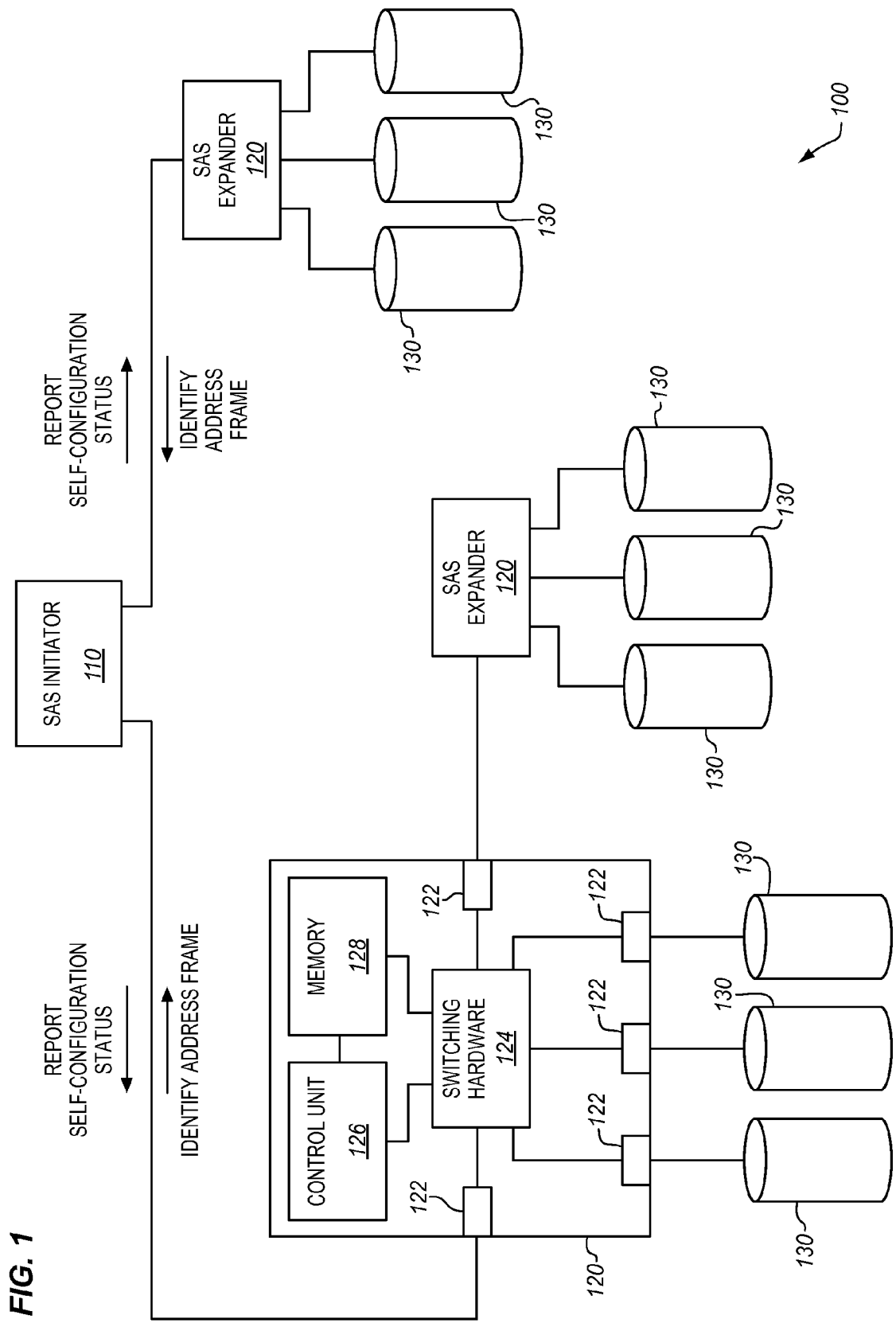
FIG. 1 is a block diagram of an exemplary SAS domain in accordance with features and aspects hereof.

FIG. 1 is a block diagram of an exemplary Serial Attached SCSI (SAS) domain 100 in accordance with features and aspects hereof. SAS domain 100 couples a SAS initiator 110 with a number of end devices 130 (e.g., SAS or Serial Advanced Technology Attachment (SATA) targets). SAS initiator 110 is coupled to these target devices via enhanced SAS expanders 120. Thus, in an operating environment, as commands are generated by SAS initiator 110 and directed to end devices 130, SAS expanders 120 may establish connections between SAS initiator 110 and end devices 130.

SAS initiator 110 comprises any suitable SAS initiator device operable to generate commands directed to end devices 130. For example, SAS initiator 110 may read or write data on end devices 130 based upon input from a host. Initiator 110 may comprise an independent SAS device, a Host Bus Adapter (HBA) of a host, an integrated component of a host, etc. During discovery (i.e., prior to normal operation of the system), SAS initiator 110 generates discovery commands that are disseminated throughout SAS domain 100 in order to identify the devices on SAS domain 100.

End devices 130 may comprise any suitable SAS or SATA target devices in accordance with SAS/SATA specifications. For example, end devices 130 may comprise storage devices that provision logical volumes of data which are accessible to SAS initiator 110.

Enhanced SAS expanders 120 are capable of routing commands between initiator 110 and end devices 130. For example, expander 120 may establish connections between initiator 110 and one or more of end devices 130. In this embodiment, each expander 120 includes multiple SAS ports 122 which are switchably connected via switching hardware 124. A control unit 126 within each expander manages the general operations of the expander.

Each SAS port 122 comprises one or more physical links with associated transceivers (PHYs). Switching hardware 124 is operable to establish connections between various PHYs in order to enable communications between them. The operations of switching hardware 124 (e.g. a "crossbar" switch) are managed by control logic and hardware at expander 120, which in this embodiment is a component of control unit 126. Control unit 126 may be implemented, for example, as custom circuitry, as a special or general purpose processor executing programmed instructions stored in an associated program memory, or some combination thereof.

Each enhanced SAS expander 120 has been improved to self-configure the routing attributes of its ports during or after the discovery process on SAS domain 100. Specifically, enhanced SAS expanders 120 may determine whether each port should be set to table routing, to direct routing, or to subtractive routing. This is accomplished by logic implemented at control unit 126 described below.

During the discovery process, each control unit 126 waits for receipt of a Serial Management Protocol (SMP) REPORT SELF-CONFIGURATION STATUS command at a port 122 of its expander 120 (e.g., before initiating any discovery processes). These requests are generated by SAS initiator 110 during discovery, and are propagated throughout the SAS domain to the SAS expanders. When a REPORT SELF-CONFIGURATION STATUS command is received at the expander, control unit 126 identifies the port 122 that received the command. The port that received the command is coupled (e.g., via one or more expanders) to the SAS initiator, and therefore the routing attributes for the port are set to subtractive routing. If the port that received the command is directly coupled with the SAS initiator, the port may alternatively be set to direct routing instead of subtractive routing.

Control unit 126 then identifies each port that did not receive the REPORT SELF-CONFIGURATION STATUS command described above, and initiates a SAS handshake with each device directly coupled to such ports. A SAS handshake may involve transmitting an SMP IDENTIFY Address Frame (IAF) to each device that is directly coupled to a port of the expander. The handshake process may further include receiving an IDENTIFY address frame from each directly coupled device, indicating whether the directly coupled device is another SAS expander or is an end device. If the device is an end device, then control unit 126 sets the routing attribute for the port to direct routing. Alternatively, if the device is another expander, control unit 126 sets the routing attribute to table routing, and forwards/propagates a REPORT SELF-CONFIGURATION STATUS command to the coupled expander, which then performs its own processes to configure the routing attributes of its PHYs in response to receiving the command.

After the routing attributes for the ports have been configured, a memory 128 (e.g., a set of registers, a solid-state memory, RAM, etc.) at SAS expander 120 may be populated with the routing information to allow use of the ports that are configured for table routing. This may occur in accordance with SAS standards well known to those of ordinary skill in the art. For example, the SAS expander may comprise a self-configuring expander device as defined in accordance with SAS standards (e.g., SAS version 2, revision 15, issued by the T10 committee on 19 November 2008 and herein incorporated by reference). In this context, "self-configuring" indicates that the SAS expander may populate its own routing tables with SAS addresses. As defined in SAS standards, "self-configuring" does not refer to expanders that may configure the routing attributes of their own ports.

The enhanced SAS expanders 120 described above ensure that SAS expanders 120 that are "beneath" SAS initiator 110 will subtractively route requests "up" towards SAS initiator 110. As used herein, expanders further from the root complex (i.e., expanders further from the SAS initiator) are referred to as downstream expanders. The application of routing attributes described herein prevents situations where improperly configured routing attributes of SAS expanders would otherwise result in a nonfunctional or unstable SAS domain. Furthermore, programming routing attributes at the SAS expanders (instead of remotely via SAS initiator 110) saves processing resources at SAS initiator 110, which may increase the speed of the discovery process.

Note that the particular arrangement of components described herein is merely intended to be exemplary, and one of ordinary skill in the art will appreciate that the specific arrangement and configuration of SAS domain devices is merely a matter of design choice.

Figure 2:
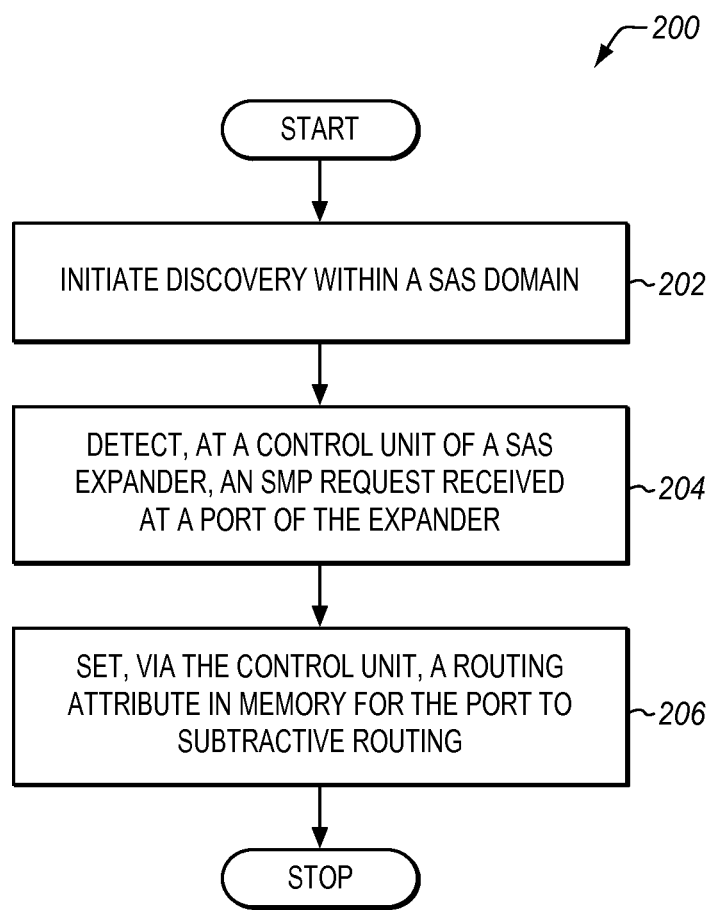
FIG. 2 is a flowchart describing an exemplary method of operating a SAS expander in accordance with features and aspects hereof.

FIG. 2 is a flowchart describing an exemplary method 200 of operating a SAS expander in accordance with features and aspects hereof. The method of FIG. 2 may be operable in a SAS domain such as described above with regard to FIG. 1.

The steps of the flowcharts described herein are not all inclusive and may include other steps not shown. The steps described herein may also be performed in an alternative order.

In step 202, SAS discovery processes are initiated within a SAS domain. SAS discovery processes are typically performed at start-of-day, and may be used to initially configure the SAS domain (e.g., discovery may be used to program the routing attributes of the various ports of SAS expanders within the domain, routing tables used to establish connections between remote devices, etc.). For example, discovery may occur after a power on reset of the SAS domain. The initial configuration set up during/after discovery ensures that SAS communications can be established between the various elements of the domain. The discovery process may be started by a SAS initiator, and may be propagated to remote devices by a switched fabric of SAS expanders (e.g., a Service Delivery Subsystem (SDS) of the SAS domain).

For example, the SAS initiator may start a SAS handshake with one or more devices that it is directly coupled with. This may include sending an IDENTIFY address frame to the directly coupled device, and receiving an IDENTIFY address frame from the directly coupled device in response. The SAS initiator may then determine, based on the received IDENTIFY frame, that the device is a SAS expander. The SAS initiator may then transmit an SMP REPORT SELF-CONFIGURATION STATUS command/request to the expander.

In step 204, a control unit of the SAS expander detects receipt of an SMP request at one of its ports. For example, the expander may receive the SMP request because the request is directly addressed to the SAS expander. This request comprises an SMP REPORT SELF-CONFIGURATION STATUS command.

In step 206, the control unit of the expander sets the routing attributes for the port that received the SMP request to subtractive routing. Thus, in this system, the subtractive routing ports, when followed in sequence from expander to expander, all lead upstream towards the SAS initiator.

The expander may then initiate SAS handshakes with devices that are directly coupled with its remaining ports. During the SAS handshake for a given port, the expander transmits IDENTIFY address frames to directly coupled devices (i.e., the devices that are directly coupled to the unconfigured ports), and receives IDENTIFY address frames from the directly coupled devices. If an IDENTIFY address frame indicates that a directly coupled device is an end device (such as a SAS/SATA target), then the port is set to direct routing.

However, if the directly coupled port is another SAS expander, then the first SAS expander may send an SMP REPORT SELF-CONFIGURATION STATUS command. The receipt of the SMP REPORT SELF-CONFIGURATION STATUS command may trigger method 200 at the other expander. Thus, the SMP command/request enables downstream SAS expanders to properly configure their own routing attributes according to method 200, and so on, in a recursive process.

Because of the nature of the processes described above, it may be desirable for the routing attribute configuration process described above to be performed in a single initiator environment.

Figure 3:
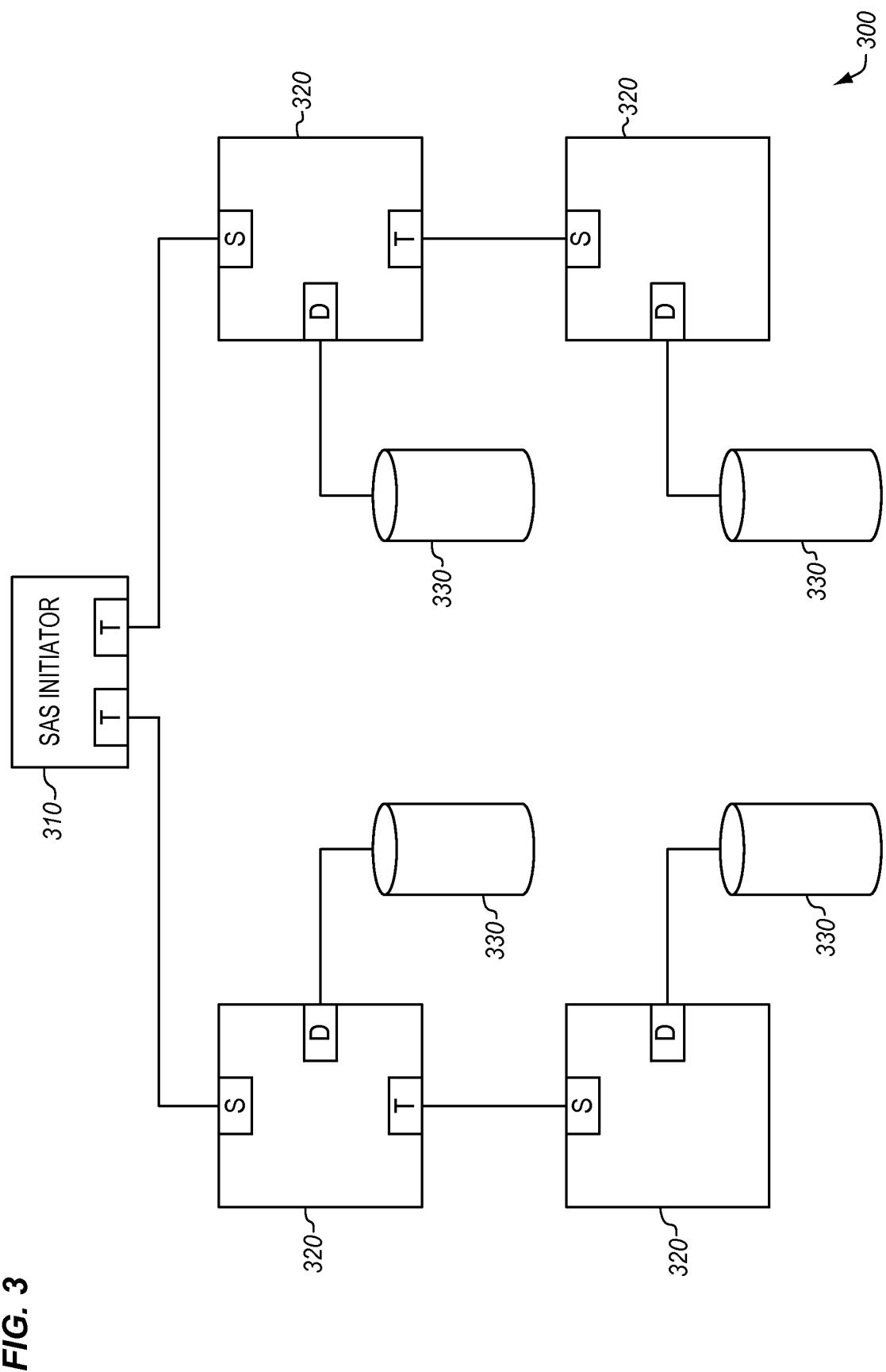
FIG. 3 is a block diagram illustrating an exemplary SAS domain with ports that have been configured in accordance with features and aspects hereof.

FIG. 3 is a block diagram illustrating an exemplary SAS domain 300 with ports that have been configured in accordance with features and aspects hereof According to FIG. 3, a SAS initiator 310 (in this case, a controller of multiple storage devices on the SAS domain) includes multiple SAS ports. Each port has been initially configured by the controller to table routing. Further according to FIG. 3, each SAS expander 320 has configured the routing attributes of its ports. Ports that are directly coupled with end devices 330 are set to direct routing, while ports that are directly coupled with an upstream SAS expander are set to subtractive routing. Ports that are directly coupled with downstream expanders are set to table routing.

Figure 4:
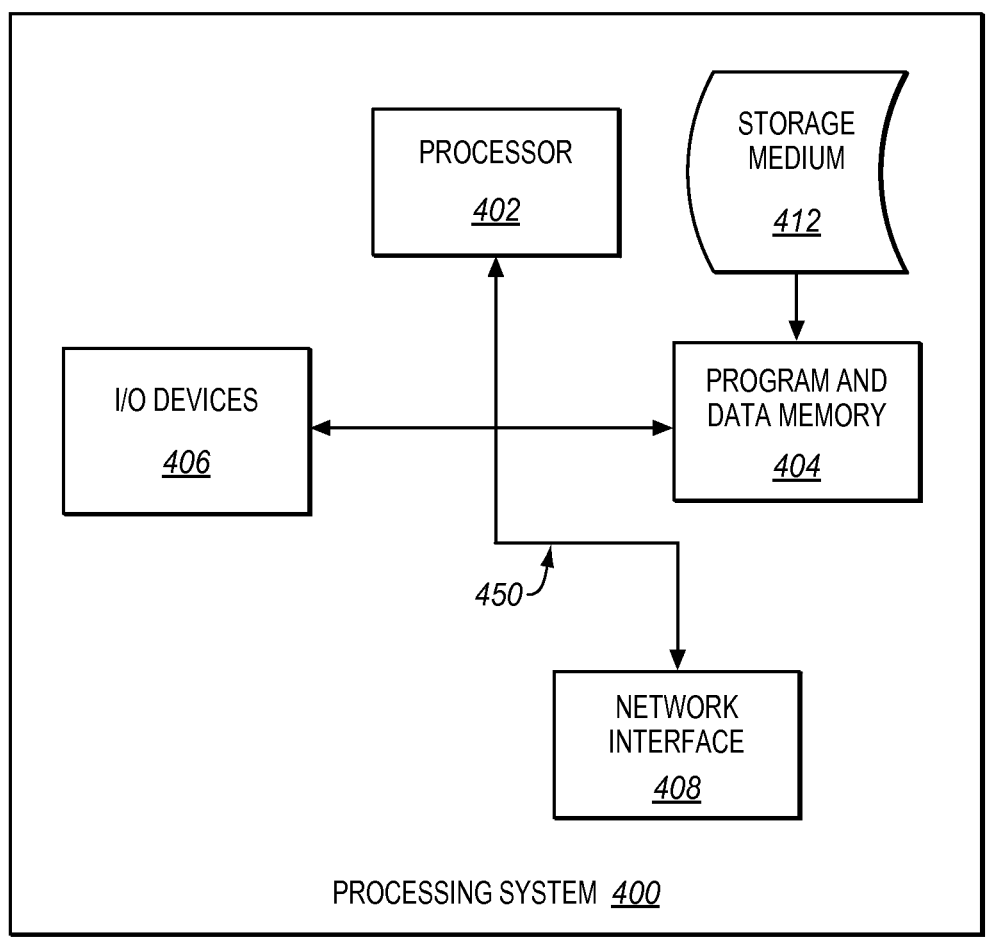
FIG. 4 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of expander 120 to perform the various operations disclosed herein. FIG. 4 illustrates a processing system 400, such as in enhanced expander 120 of FIG. 1, operable to execute a computer readable medium embodying programmed instructions to perform desired functions in an exemplary embodiment. Processing system 400 is operable to perform the above operations by executing programmed instructions tangibly embodied on computer readable storage medium 412. In this regard, embodiments of the invention can take the form of a computer program accessible via computer-readable medium 412 providing program code for use by a computer or any other instruction execution system. For the purposes of this description, computer readable storage medium 412 can be anything that can contain or store the program for use by the computer.

Computer readable storage medium 412 can be an electronic, magnetic, optical, electromagnetic, infrared, or semiconductor device. Examples of computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 400, being suitable for storing and/or executing the program code, includes at least one processor 402 coupled to program and data memory 404 through a system bus 450. Program and data memory 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (e.g., PHYs) can be coupled either directly or through intervening I/O controllers. Network adapter interfaces 408 may also be integrated with the system to enable processing system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) expander comprising:
   multiple physical links with associated transceivers (PHYs), wherein the PHYs are configured into ports at the expander;
   a memory that defines routing attributes for each of the ports; and
   a control unit operable to detect a discovery Serial Management Protocol (SMP) request received at a port of the expander, and further operable to set the routing attribute for the port to subtractive routing responsive to detecting the SMP request if the SMP request comprises a REPORT SELF-CONFIGURATION STATUS command.

2. The SAS expander of claim 1 wherein:
   the control unit is further operable to determine, if the SMP request comprises a REPORT SELF-CONFIGURATION STATUS command, that the port that received the SMP request is coupled for communication with a SAS initiator.

3. The SAS expander of claim 1 wherein:
   the control unit is further operable to transmit REPORT SELF-CONFIGURATION STATUS messages to directly coupled expanders.

4. The SAS expander of claim 1 wherein:
   the control unit is further operable to propagate an SMP IDENTIFY address frame request via an other port of the SAS expander, and is further operable to determine, based upon an IDENTIFY address frame received in response to the propagated SMP IDENTIFY address frame, whether to configure the routing attribute for the other port to table routing or direct routing.

5. The SAS expander of claim 1 wherein:
   the control unit is further operable, at power on of the SAS expander and before receiving the SMP request, to configure all ports of the SAS expander to table routing.

6. The SAS expander of claim 4 wherein:
   the control unit is further operable to determine, based upon the received IDENTIFY address frame, whether a SAS device coupled with the other port is a SAS expander or an end device, is operable to configure the routing attribute for the other port to table routing if the SAS device is an expander, and is operable to configure the routing attribute for the other port to direct routing if the SAS device is an end device.

7. The SAS expander of claim 4 wherein:
   the control unit is further operable to populate a routing table based upon information received in one or more IDENTIFY address frames, and to establish connections with ports set to table routing by consulting the routing table.

8. A method for operating a Serial Attached SCSI (SAS) expander comprising multiple physical links with associated transceivers (PHYs), wherein the PHYs are configured into ports, the method comprising:
   detecting, via a control unit of the expander, a discovery Serial Management Protocol (SMP) request received at a port of the expander; and
   setting, via the control unit, a routing attribute in memory for the port to subtractive routing responsive to detecting the SMP request if the SMP request comprises a REPORT SELF-CONFIGURATION STATUS command.

9. The method of claim 8 further comprising:
   determining, if the SMP request comprises a REPORT SELF-CONFIGURATION STATUS command, that the port that received the SMP request is coupled for communication with a SAS initiator.

10. The method of claim 8 further comprising:
    transmitting REPORT SELF-CONFIGURATION STATUS messages to expanders that are directly coupled with the expander.

11. The method of claim 8 further comprising:
    propagating, at the expander, an SMP IDENTIFY address frame via an other port of the SAS expander; and
    determining at the control unit, based upon an IDENTIFY address frame received in response to the propagated IDENTIFY address frame, whether to configure the routing attribute for the other port to table routing or direct routing.

12. The method of claim 8 wherein:
    the control unit is further operable, at power on of the SAS expander and before receiving the SMP request, to configure all ports of the SAS expander to table routing.

13. The method of claim 11 further comprising:
    determining at the control unit, based upon the received IDENTIFY address frame, whether a SAS device coupled with the other port is a SAS expander or an end device;
    configuring, via the control unit, the routing attribute for the other port to table routing if the SAS device is an expander; and
    configuring, via the control unit, the routing attribute for the other port to direct routing if the SAS device is an end device.

14. The method of claim 11 further comprising:
    populating, via the control unit, a routing table based upon information received in one or more IDENTIFY address frames; and
    establishing connections with ports set to table routing by consulting the routing table.

15. A non-transitory computer readable medium embodying programmed instructions which, when executed by a processor, are operable for performing a method for operating a Serial Attached SCSI (SAS) expander comprising multiple physical links with associated transceivers (PHYs), wherein the PHYs are configured into ports, the method comprising:
    detecting, via a control unit of the expander, a discovery Serial Management Protocol (SMP) request received at a port of the expander; and
    setting, via the control unit, a routing attribute in memory for the port to subtractive routing responsive to detecting the SMP request if the SMP request comprises a REPORT SELF-CONFIGURATION STATUS command.

16. The medium of claim 15 further comprising:
    determining, if the SMP request comprises a REPORT SELF-CONFIGURATION STATUS command, that the port that received the SMP request is coupled for communication with a SAS initiator.

17. The medium of claim 15 wherein the method further comprises:
    transmitting REPORT SELF-CONFIGURATION STATUS messages to expanders that are directly coupled with the expander.

18. The medium of claim 15 wherein the method further comprises:
    propagating, at the expander, an SMP IDENTIFY address frame via an other port of the SAS expander; and
    determining at the control unit, based upon an IDENTIFY address frame received in response to the propagated IDENTIFY address frame, whether to configure the routing attribute for the other port to table routing or direct routing.

19. The medium of claim 18 wherein the method further comprises:
  determining at the control unit, based upon the received IDENTIFY address frame, whether a SAS device coupled with the other port is a SAS expander or an end device;
  configuring, via the control unit, the routing attribute for the other port to table routing if the SAS device is an expander; and
  configuring, via the control unit, the routing attribute for the other port to direct routing if the SAS device is an end device.

20. The medium of claim 18 wherein the method further comprises:
  populating, via the control unit, a routing table based upon information received in one or more IDENTIFY address frames; and
  establishing connections with ports set to table routing by consulting the routing table.

\* \* \* \* \*